United States Patent
Lee

[11] Patent Number: 6,164,790
[45] Date of Patent: Dec. 26, 2000

[54] BACK LIGHT UNIT FOR A LIQUID CRYSTAL DISPLAY DEVICE

[75] Inventor: Jong Hoon Lee, Seoul, Rep. of Korea

[73] Assignee: LG. Philips LCD Co., Ltd., Seoul, Rep. of Korea

[21] Appl. No.: 09/213,850

[22] Filed: Dec. 17, 1998

[51] Int. Cl.[7] .................................. F21V 8/00; F21V 5/02
[52] U.S. Cl. ............................ 362/31; 362/330; 362/339
[58] Field of Search ............................... 362/26, 27, 31, 362/330, 339; 349/62, 64, 65

[56] References Cited

U.S. PATENT DOCUMENTS

| | | | |
|---|---|---|---|
| 5,400,224 | 3/1995 | DuNah et al. | 362/31 |
| 5,408,388 | 4/1995 | Kobayashi et al. | 362/31 |
| 5,600,455 | 2/1997 | Ishikawa et al. | 362/31 |
| 5,704,703 | 1/1998 | Yamada et al. | 362/27 |
| 5,711,589 | 1/1998 | Oe et al. | 362/31 |
| 5,797,668 | 8/1998 | Kojima et al. | 362/31 |
| 5,926,601 | 7/1999 | Tai et al. | 349/64 |

*Primary Examiner*—Alan Cariaso

[57] ABSTRACT

A light guide panel of a back light unit for an LCD which is used for many display system includes a light guide which has a plurality of defined areas on the bottom surface and a uniform pattern. The uniform pattern has a geometrical shape in one area but the patterns of each defined area are different so as to provide a greatly improved brightness distribution.

27 Claims, 11 Drawing Sheets

(a)

(b)

(c)

(d)

BACK LIGHT UNIT FOR A LIQUID CRYSTAL DISPLAY DEVICE

BACKGROUND OF THE INVENTION

1. Field of the Invention

The present invention relates to a back light unit used for a liquid crystal display device (LCD) and more specifically, the present invention relates to a light guide panel of the back light unit for an LCD which is used for a display unit of a computer system, AV(Audio and Video) system or mobile telephone system.

2. Description of the Background Art

Generally, a liquid crystal display device includes a liquid crystal panel 10 which has two substrates and a liquid crystal inserted therebetween, a back light unit 20 which is disposed under the liquid crystal panel 10 and cases 1 and 2 as shown in FIG. 1 which is a perspective view showing the structure of the conventional LCD.

The back light unit 20 is arranged to distribute a light from a light source uniformly over the surface of the liquid crystal panel 10. There are a few kinds of back light units 20 such as a direct back light type (or direct type) and an edge light type.

Referring to the FIG. 2 which is a cross-sectional view of the back light unit 20 cut along line II—II of FIG. 1, the direct type back light unit 21 includes a housing 70 which has a reflective sheet 60 disposed at the bottom and a lamp 50 such as a fluorescence cathode tube at the bottom portion of the housing 70, a diffusing sheet 40 in the housing 70 and a light condenser 30 disposed on the diffusing sheet 40. Because the lamp 50 is disposed inside the display area of the liquid crystal panel 10, the brightness distribution of the liquid crystal panel is not uniform and the liquid crystal and the TFT switching elements can be damaged by the heat energy of the back light source.

Therefore, some distance or space between the lamp 50 and the diffusing sheet 40 is required. A patterned light blocking element disposed at the edge of the lamp 50 may also be needed. Because of these required structural elements, it is very difficult to reduce the thickness of the direct type back light unit 21.

Referring to the FIG. 3 which is a cross-sectional view of the back light unit 20 cut along line III—III of FIG. 1, the edge light type back light unit 22 includes a light guide 80, a lamp 50 which is attached to at least one edge of the light guide 80, and a U-type reflector 61 which surrounds the lamp 50. An open portion of the reflector 61 is fixed at the edge of the light guide 80, a reflecting sheet 60 at the bottom of the light guide 80, a diffusing sheet 40 on the light guide 80 and a light condenser 30 on the diffusing sheet 40.

Because the lamp 50 is disposed at the edge of the light guide 80, the thickness of the LCD can be minimized. Furthermore, the liquid crystal and the TFT switching elements are not damaged by the heat energy of the back light. Therefore, the edge light type has some advantages over the direct type in that it is thinner and provides enhanced picture quality.

FIG. 4 is a cross-sectional view which illustrates a conventional structure of the edge type back light unit. The edge type back light unit includes a light guide 80 which has a printed dot pattern or a carved-out V-shape pattern on at least one surface, a diffusing sheet 40 disposed on the light guide 80 which is made of half-transparent PET or polycarbonate, a lamp 50 which is attached to at least one side of the light guide 80 and a light condenser 30 disposed on the diffusing sheet 40. Because the diffusing sheet 40 is half-transparent, the sheet 40 can hide the printed dot pattern or the carved-out V-shape pattern of the light guide 80. The light condenser 30 gathers diffused light from the diffusing sheet 40. For example, as shown in FIG. 4, if the incident light has an angle $(\theta)1$ and $(\theta)2$ relative to the normal line A of the surface of the light condenser 30, then the light transmitted through the light condenser 30 is refracted at the transmittance surface of the light condenser 30. Preferably, two of the light condensers 30 can be used for enhancing the brightness.

However, the brightness of the liquid crystal panel 10 decreases according to the distance from the lamp 50. In order to overcome this problem in the edge light type, some solutions have been attempted. One solution is to form the light guide to have a tapered shape wherein the thickness of the edge of the light guide 80 which contacts the lamp 50 is relatively thick and the counter edge is relatively thin. Another solution is to coat a plurality of dots on the surface of the light guide 80 wherein the area of the dots is varied by the distance from the lamp 50.

Referring to FIGS. 5–9 which are some examples of the edge type back light units, the structure of the light guide 80 will be explained in detail. FIG. 5 is one example of the device shown in FIG. 4. FIGS. 6(*a*) and 6(*b*) are cross-sectional views which illustrate the light guide shown in FIGS. 4 and 5. FIGS. 7, 8 and 9 illustrate variable patterns formed on one side of the light guide shown in FIGS. 4 and 5.

The light guide 80 is generally made of a transparent material such as an acrylic resin. In addition, a dot pattern 100 is printed as shown in FIGS. 6(*a*) and 9 or a V-shape pattern 105 is carved as shown in FIGS. 6*b* and 7. By forming these patterns, the brightness of the light which is incident to the liquid crystal panel is made uniform. In the case of the dot pattern, the size of the dots increases according to the distance from the lamp 50 attached on one side of the light guide 80 as shown in FIG. 6(*a*). In the case of the carved V-shaped pattern, the distance between adjacent patterns decreases according to the distance from the lamp 50 as shown in FIG. 6(*b*). The light guide 80 can be a plate type or a tapered type.

The conventional edge light type back light unit has some problems as described hereinafter.

First, in the case of the dot pattern 100 (shown in FIG. 9) which is located at the bottom side 90 of the light guide 80, the printed material is one of a volatile hardening ink and a UV hardening ink which includes titan oxide particles for diffused reflection of the light. It is very difficult to control the viscosity of the printed material when the ink is printed via a screen printing method because the size of the dots 100 is variable according to the distance from the lamp 50.

For example, the dots 100 for diffusing reflection of the back light have various sizes from tens of $\mu$m to thousands of $\mu$m. When the dots having a size in the range of tens of $\mu$m are printed, the viscosity of the ink should be lower because the ink can hardly pass through the pattern of the screen. However, when the dots having a size of thousands of $\mu$m are printed, the viscosity of the ink should be larger because the ink can easily pass through the pattern of the screen. Therefore, if the viscosity of the ink has a high value, some of small dots can not be printed. On the other hand, if the viscosity of the ink has a low value, some of large dots can be blotted. Furthermore, the liquid crystal can be damaged by the heat energy of the light at the dots so that the quality of the LCD is inferior.

Second, in the case of the carved V-shape pattern 105 (shown in FIGS. 7 and 8) which is located at the bottom side 90 of the light guide 80, it is very difficult to determine the optimum condition of the distance variation of the patterns. In addition, determination of the maximum status of the brightness distribution requires a great deal of time, effort and expense.

SUMMARY OF THE INVENTION

In order to overcome the problems described above, preferred embodiments of the present invention provide a light guide which includes a diffused reflector that has a uniformly distributed brightness and a very high brightness. Preferred embodiments of the present invention also provide a light guide which includes a diffused reflector that has a greatly improved pattern for achieving uniformly distributed brightness.

In order to solve the prior art problems described above and to achieve the advantages described in the preceding paragraph, preferred embodiments of the present invention provide a light guide which has a plurality of defined areas on a first side of the light guide and a first geometrical pattern on the first side, the first geometrical pattern having a uniform shape configuration in the all of the defined areas and each of the defined areas having at least one dimension of the geometrical pattern that is different from that of the other defined areas and a lamp attached to at least one side of the light guide.

In another preferred embodiment, a back light unit includes a light guide that has a plurality of defined areas located on the bottom surface, each of the defined areas including a plurality of geometrical shaped elements, a shape of each of the geometrical shaped elements in all of the defined areas being the same, the dimensions of the geometrical shaped elements in each particular defined area being the same as the other geometrical shaped elements in that particular defined area, and a dimension of the geometrical shaped elements in each defined area being different from that of the geometrical shaped elements in the other defined areas. According to preferred embodiments of the present invention, the geometrical shaped elements may have a substantially U-shaped furrow or ridge, or a substantially V-shaped furrow or ridge formed by carving the bottom surface of the light guide. The distance between the geometrical shaped elements is the same in each defined area of the bottom surface of the light guide. The distance between geometrical shaped elements in one defined area is different from that of the other defined areas on the bottom surface of the light guide.

Furthermore, preferred embodiments of the present invention provide a light guide which has a geometrically shaped pattern disposed on the upper surface thereof. There is no need to form the geometrical pattern to have a variable distance.

BRIEF DESCRIPTION OF THE ATTACHED DRAWINGS

The present invention will become more fully understood from the detailed description provided hereinafter and the accompanying drawings which are given by way of illustration only and therefore not limited to the present invention, and wherein.

DETAILED DESCRIPTION OF PREFERRED EMBODIMENTS

Referring to FIGS. 10a–16, some preferred embodiments of the present invention will be explained in detail.

Figure 1:
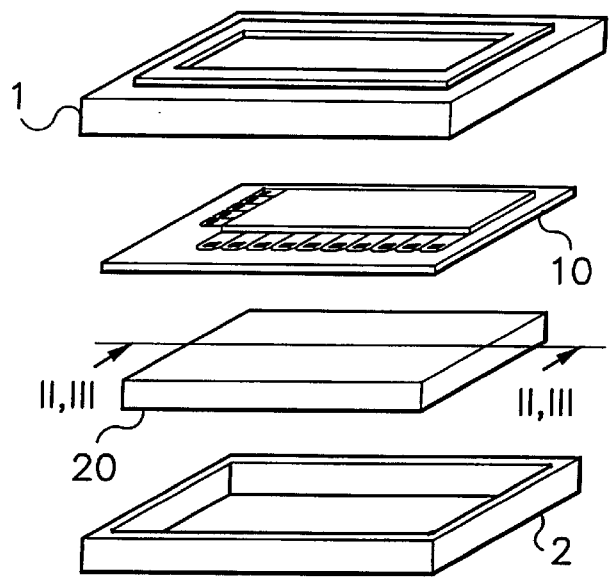
FIG. 1 is a disassembled view of the conventional liquid crystal display device.
Figure 2:
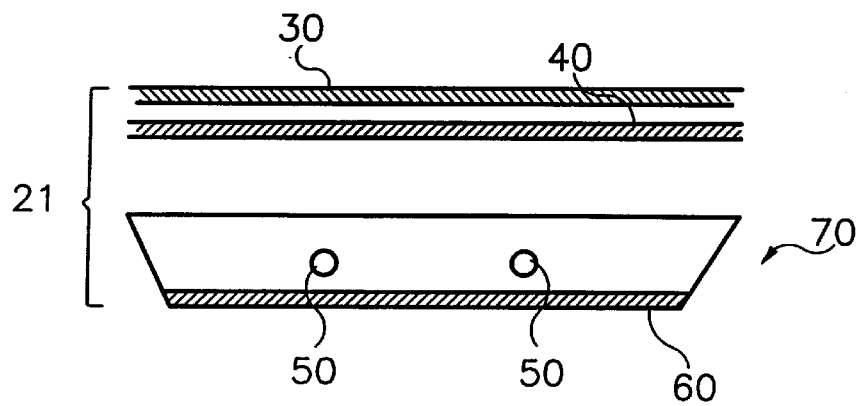
FIG. 2 is a cross-sectional view which shows the direct back light type back light unit of the conventional liquid crystal display device.
Figure 3:
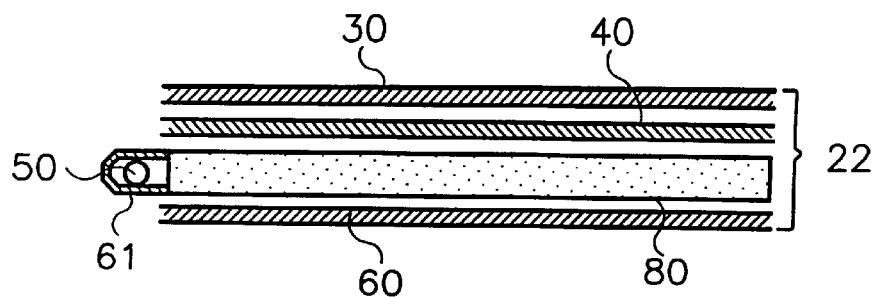
FIG. 3 is a cross-sectional view which shows the edge light type back light unit of the conventional liquid crystal display device.
Figure 4:
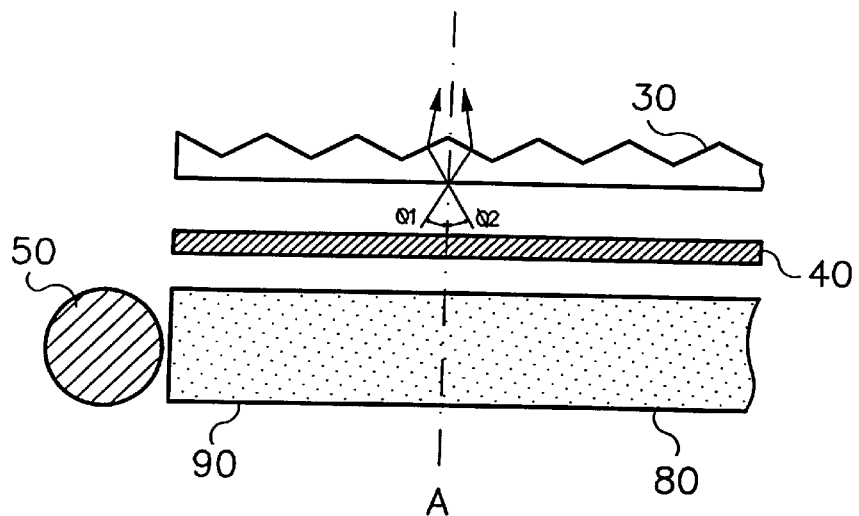
FIG. 4 is a cross-sectional view which shows the edge light type back light unit for explaining the mechanism thereof.
Figure 5:
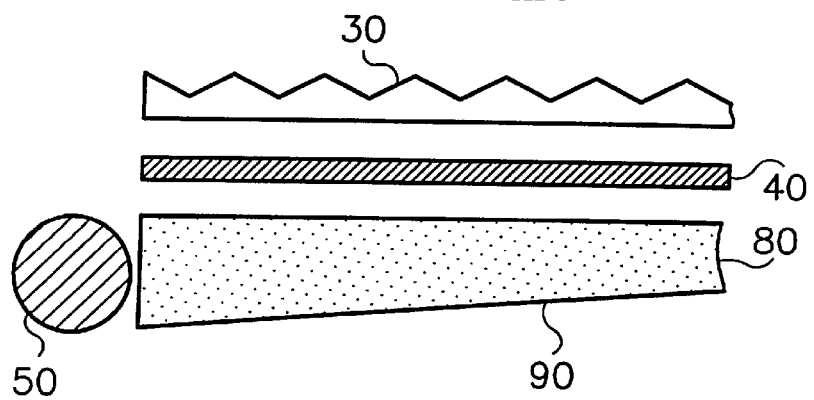
FIG. 5 is an example of the edge light type back light unit shown in FIG. 4.
Figure 6:
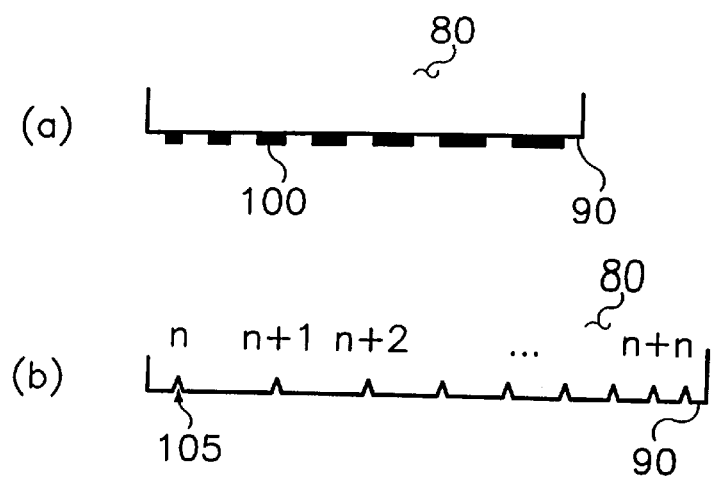
FIGS. 6a and 6b are cross-sectional views which illustrate the bottom surface of the light guide shown in FIGS. 4 and 5.
Figure 7:
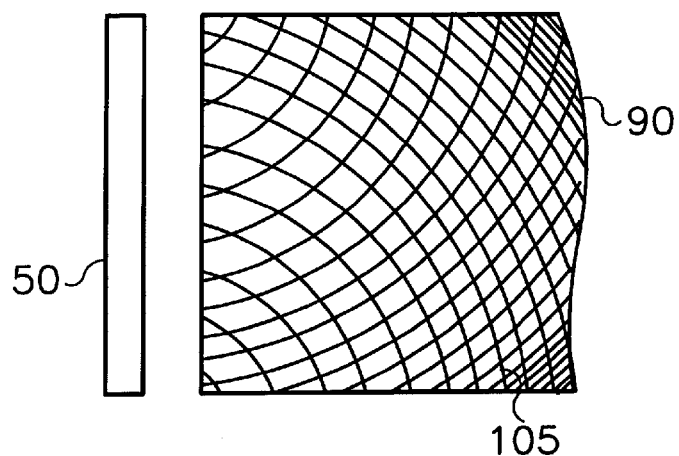
FIGS. 7–9 are plane views which show the geometrical pattern formed on the bottom surface of the light guide shown in FIGS. 4 and 5.
Figure 8:
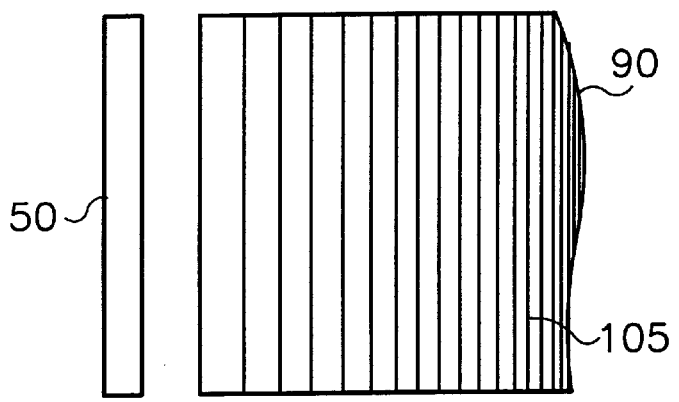
Figure 9:
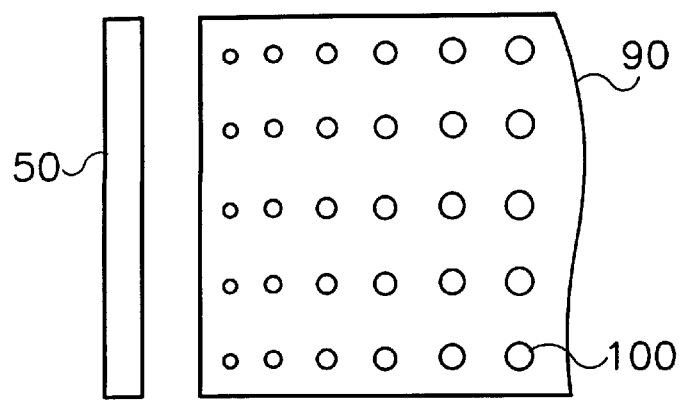
Figure 10A:
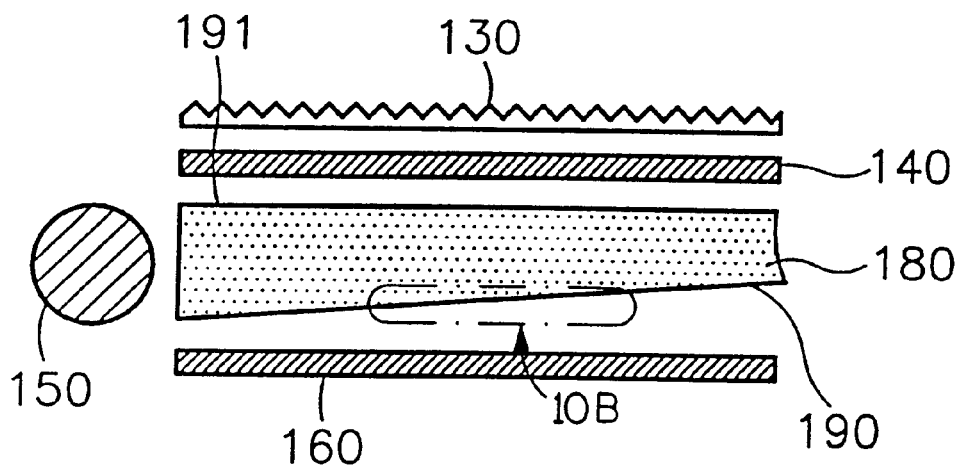
FIGS. 10a and 10b are cross-sectional views of a back light unit according to preferred embodiments of the present invention.
Figure 10B:
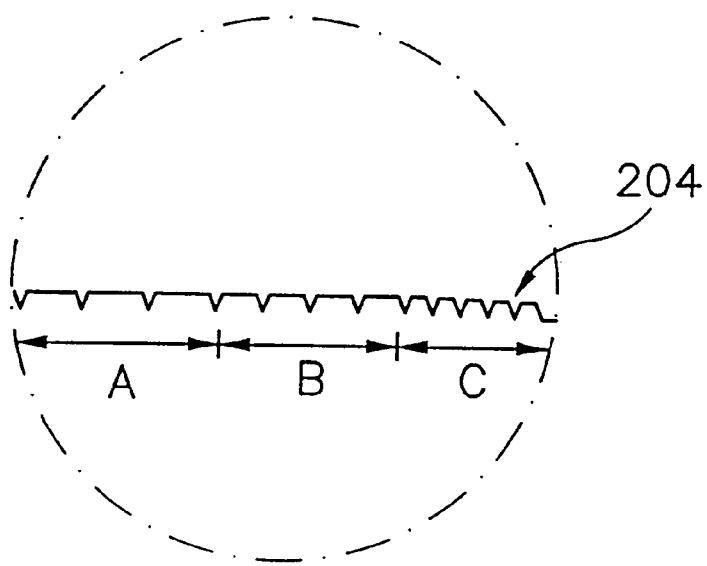

A back light unit includes a light guide 180 having a tapered plate, a lamp 150 attached at a thickest portion of the light guide 180, a reflecting sheet 160 on the bottom surface 190 of the light guide 180, a diffusing sheet 140 on the upper surface 191 of the light guide 180 and a light condenser 130 on the diffusing sheet 140 as shown in FIGS. 10a and 10b. The bottom surface 190 of the light guide 180 has a plurality of defined areas (A, B, C and D areas) and a plurality of carved, substantially V-shaped patterns or elements 204 on the bottom surface 190. The distance between the substantially V-shaped patterns is same in each one of the defined areas but the distances between patterns or elements 204 in one area is different from the distances between patterns in the other defined areas. According to one preferred embodiment of the present invention, the diffusing sheet 140 preferably includes a holograph.

Figure 11A:
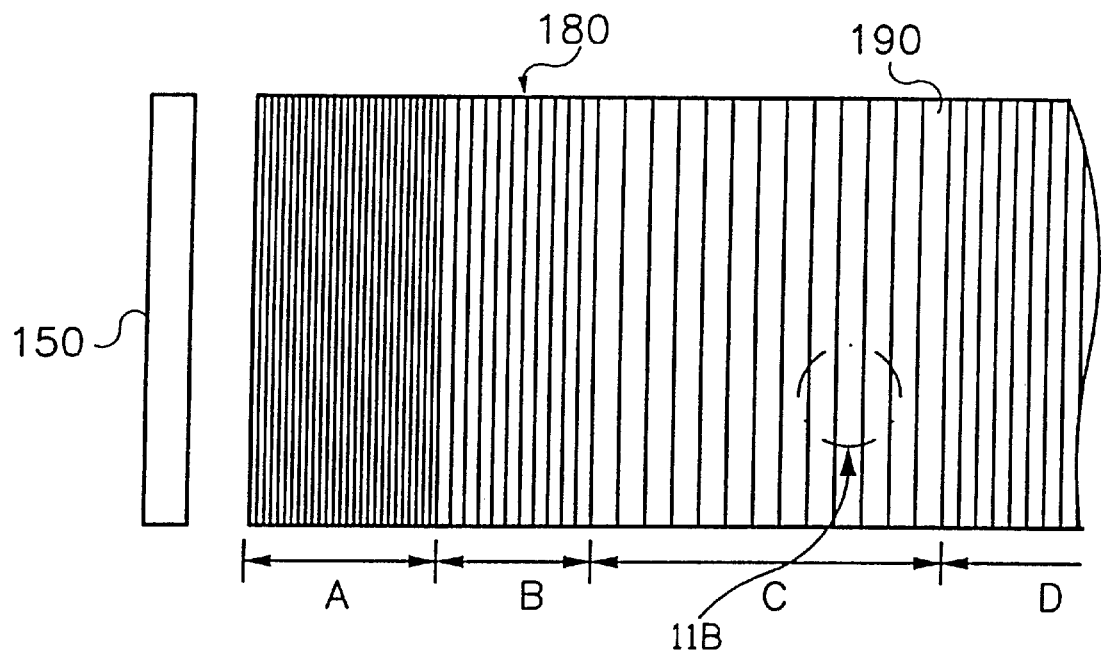
FIGS. 11a and 11b are plane views which show the geometrical pattern formed on the bottom surface of the light guide according to preferred embodiments of the present invention.
Figure 11B:
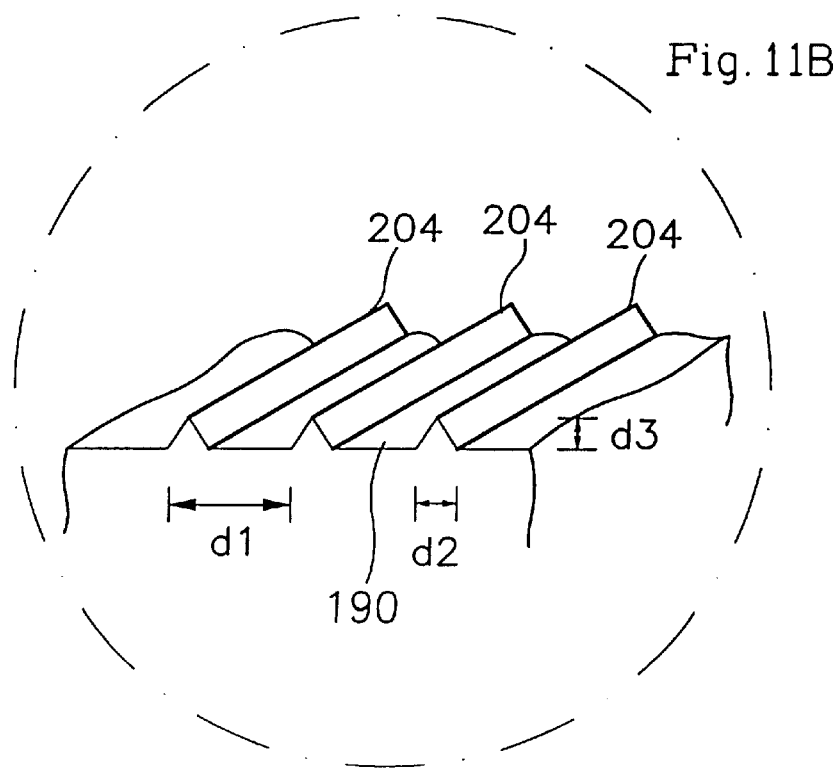

Referring to FIGS. 11a and 11b, a light guide 180 having a diagonal dimension of about 4 inches is formed using a transparent material such as an acrylic resin. A lamp 150 is attached at one side of the light guide 180. A bottom surface of the light guide 180 has, for example, seven defined areas, from area A to area G. A plurality of substantially V-shaped ridge patterns 204 are formed on the bottom surface 190 of the light guide 180 such that the patterns or elements 204 are approximately parallel to the lamp 150 and arranged to have the same distance between elements 204 within each of the defined areas. However, the distances between elements 204 of the different areas are different from each other.

For example, the width, d2, and the height, d3, of the substantially V-shaped ridge patterns 204 are, for example, about 100 μm and about 70 μm, respectively. The dimension of each defined area and the distance, d1, of the pattern of each area are shown in Table 1.

| | (unit: mm) | | | | | | |
|---|---|---|---|---|---|---|---|
| area | A | B | C | D | E | F | G |
| Width of each area | 7.5 | 6 | 12 | 12 | 9 | 10.2 | 9 |
| d1 | 0 | 0.2 | 0.5 | 0.4 | 0.3 | 0.2 | 0.15 |

According to preferred embodiments of the present invention, by using the arrangement of the elements 204 as described above, the brightness is more uniformly distributed over the LCD display area. In addition, it is very easy to maximize brightness of the back light unit.

Figure 12A:
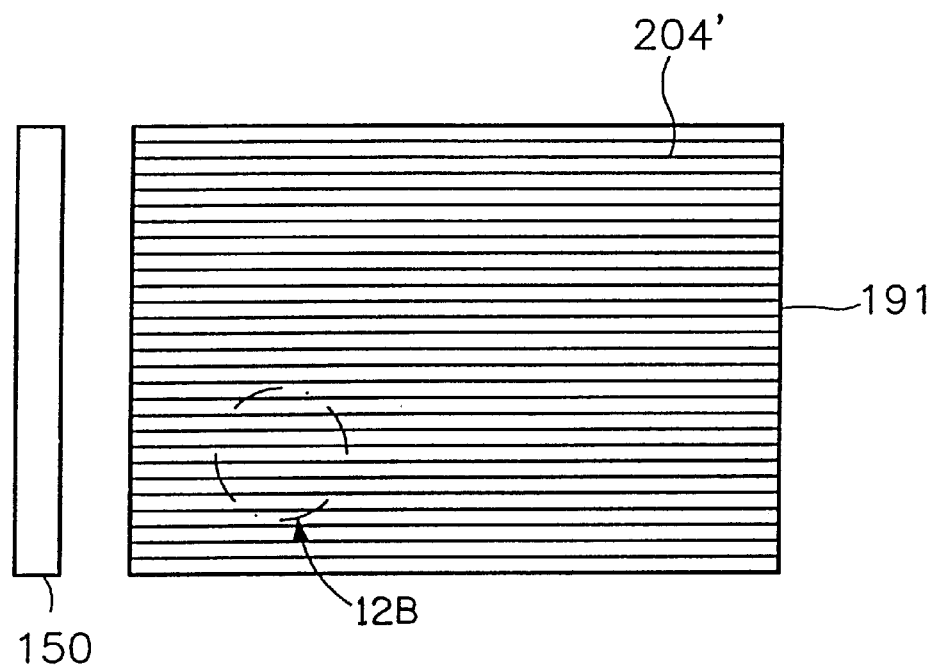
FIGS. 12a and 12b are plane views which show the geometrical pattern formed on the upper surface of the light guide according to preferred embodiments of the present invention.
Figure 12B:
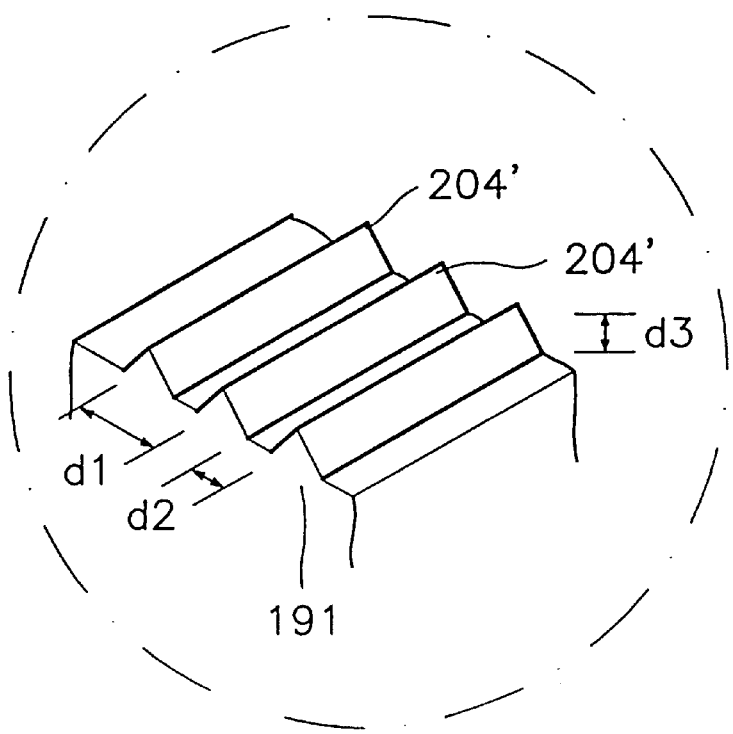

Furthermore, another substantially V-shaped ridge pattern 204' which is substantially perpendicular to the lamp 150 may be added on the upper surface 191 of the light guide 180 as shown in FIGS. 12*a* and 12*b*. This pattern has a uniform array configuration. The width d2, and height d3, of the substantially V-shaped ridge patterns 204' are, for example, about 100 μm and about 70 μm, respectively. Also, the width d1 of the patterns 204' in this example of preferred embodiments of the present invention is about 100 μm. By adding another pattern on the upper surface 191, the brightness is more uniformly distributed and has a wider angle of view.

Figure 13A:
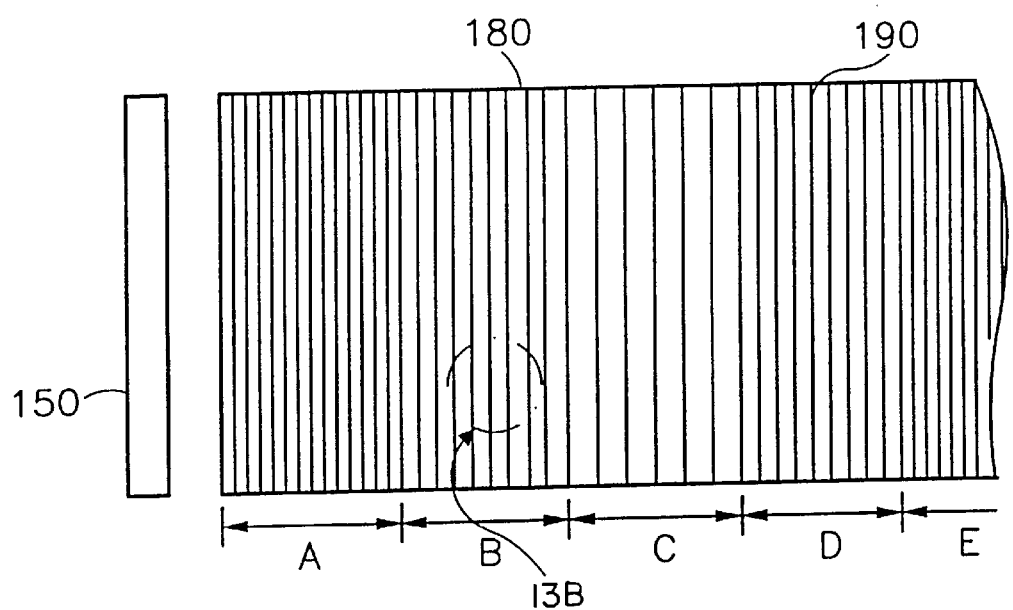
FIGS. 13a and 13b are cross-sectional views which show the geometrical pattern formed on the bottom surface of the light guide according to preferred embodiments of the present invention.
Figure 13B:
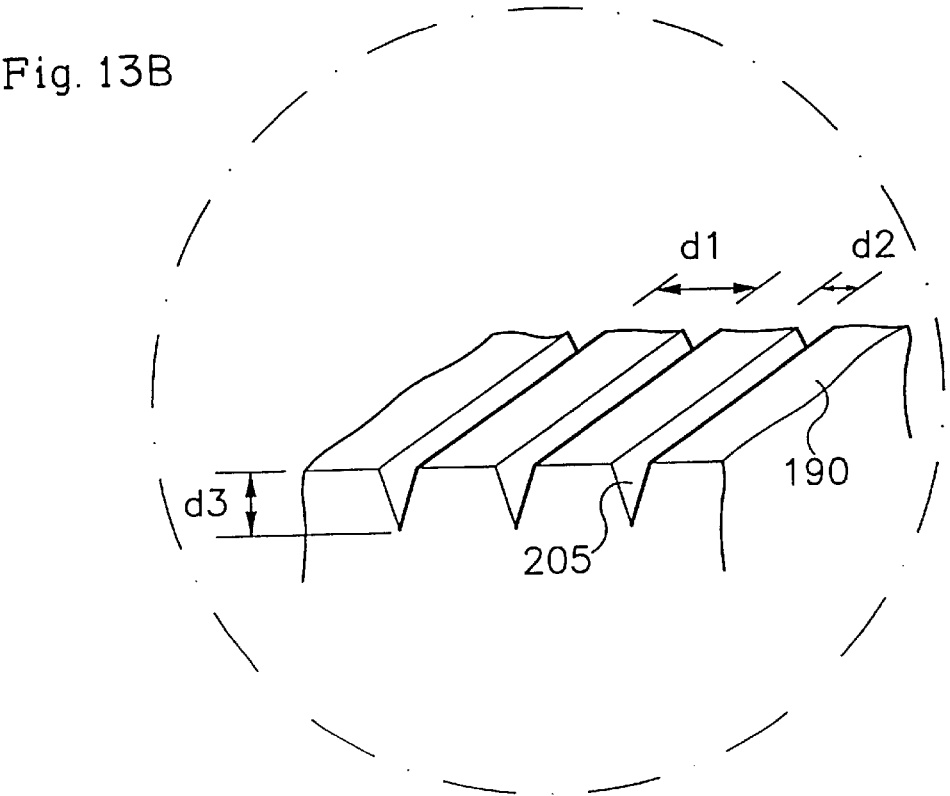

Referring to FIGS. 13*a* and 13*b*, a light guide 180 preferably has a diagonal size of about 12.1 inches and is formed by using a transparent material such as an acrylic resin. A lamp 150 is attached at one side of the light guide 180. A bottom surface of the light guide 180 preferably has sixteen defined areas which has, for example, a width of about 1 cm, from A area to P area. A plurality of substantially V-shaped ridge patterns 205 are disposed on the bottom surface 190 of the light guide 180 such that the patterns 205 are approximately parallel to the lamp 150 and arranged to have the same distance therebetween with each area.

For example, the width d2, and the height d3, of the substantially V-shaped ridge patterns 205 are about 200 μm and about 15 μm, respectively. The width of each defined area and the distance d1 of the patterns 205 of each area are shown in Table 2.

TABLE 2

| | (unit: mm) | | | | | | | |
|---|---|---|---|---|---|---|---|---|
| area | A | B | C | D | E | F | G | H |
| d1 | 0.8 | 1.0 | 1.2 | 1.0 | 0.8 | 1.0 | 0.8 | 0.6 |

| | (unit: mm) | | | | | | | |
|---|---|---|---|---|---|---|---|---|
| area | I | J | K | L | M | N | O | P |
| d1 | 0.8 | 0.6 | 0.5 | 0.6 | 0.4 | 0.5 | 0.4 | 0.5 |

Figure 14A:
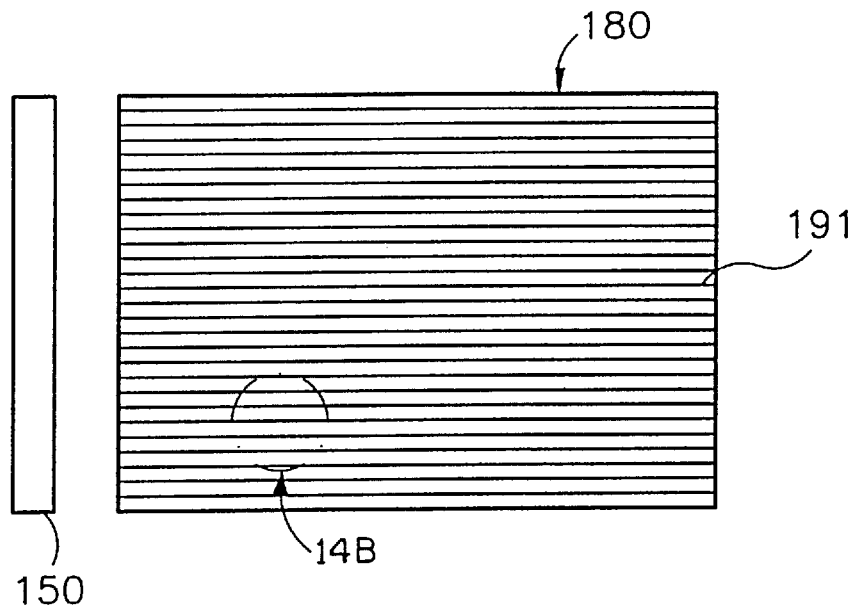
FIGS. 14a and 14b are cross-sectional views which show the geometrical pattern formed on the upper surface of the light guide according to preferred embodiments of the present invention.
Figure 14B:
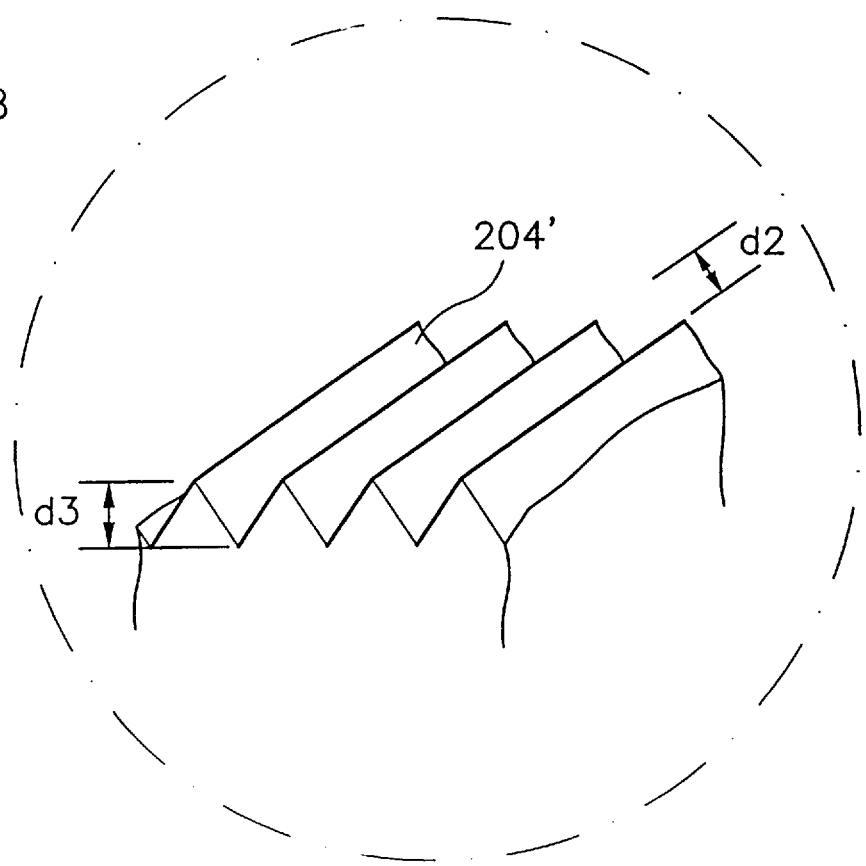

Furthermore, another substantially V-shaped ridge pattern 204' which is substantially perpendicular to the lamp 150 is preferably added on the upper surface 191 of the light guide 180 as shown in FIGS. 14*a* and 14*b*. This pattern has a uniform array configuration. The width d2 and height d3 of the substantially V-shaped ridge patterns 204' are in this example of preferred embodiments of the present invention about 100 μm and about 50 μm, respectively. The dimension of the distance d1 of the pattern 204' is about 100 μm which is the same as the width d2.

Figure 15A:
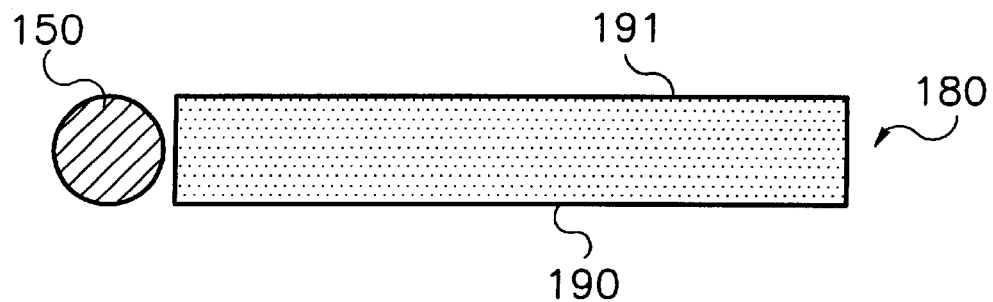
FIGS. 15a and 15b are-cross sectional views which show various light guides that have uniform thickness and continuously varied thickness, respectively.
Figure 15B:
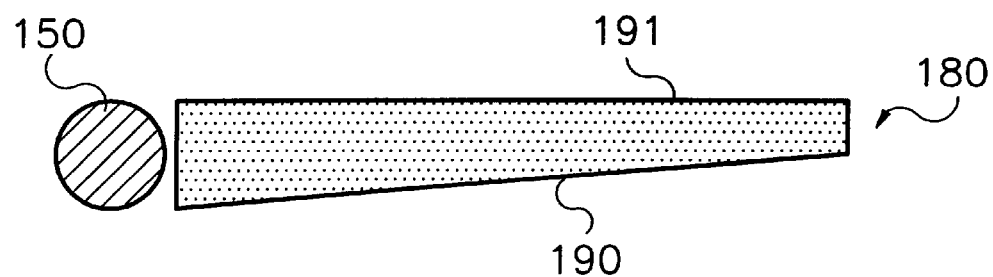
Figure 16:
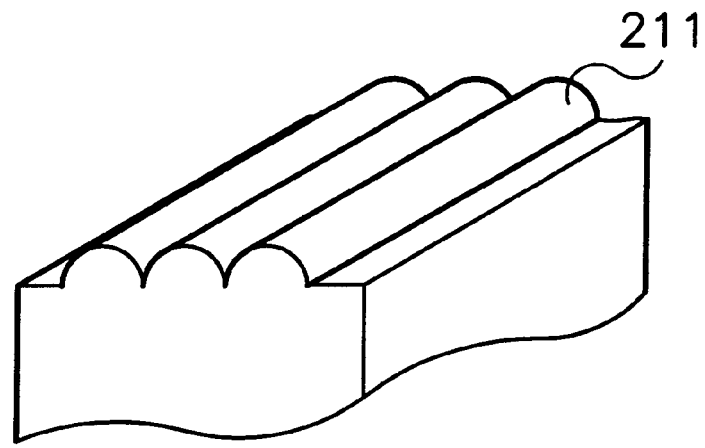
FIGS. 16a–16d are perspective views which show the various types of the patterns formed on the surface of the light guide.
Figure 16:
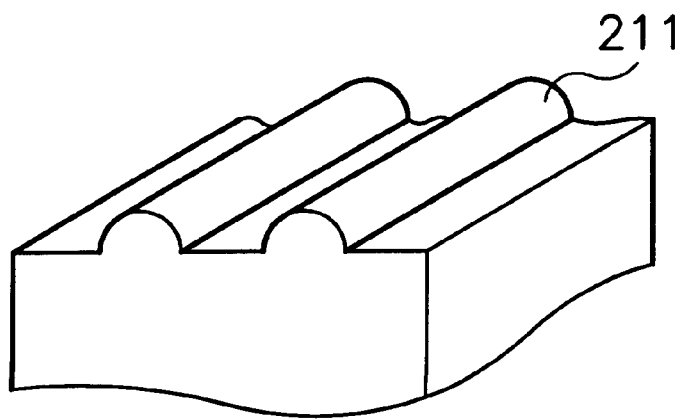
Figure 16:
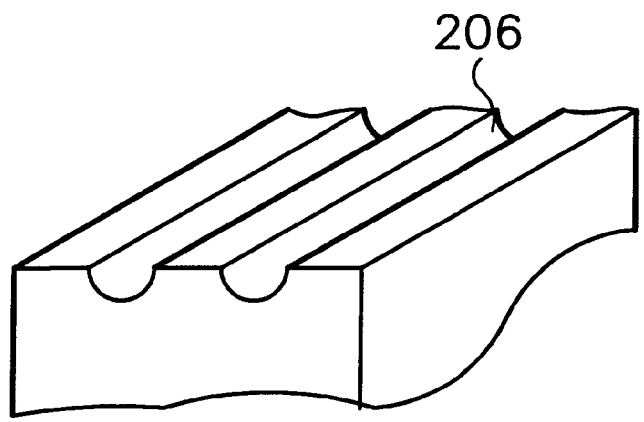
Figure 16:
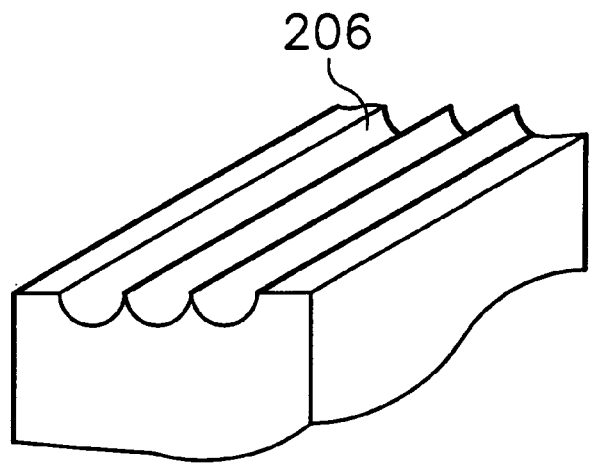

According to preferred embodiments of the present invention, the cross-sectional shape of the light guide 180 is a plate panel which has a uniform thickness as shown in FIG. 15*a*. On the other hand, the cross-sectional shape of the light guide 180 is preferably tapered and arranged to have a continuously varied thickness as shown in FIG. 15*b* in order to achieve a more uniform brightened distribution.

According to preferred embodiments of the present invention, the shape of the geometrical patterns or elements is not limited but can be of any type, for example, a substantially U-shaped ridged pattern 211 shown in FIGS. 16*a* and 16*b* or a substantially U-shaped furrowed pattern 206 shown FIGS. 16*c* and 16*d*.

According to preferred embodiments of the present invention, the size of the geometrical pattern has certain range in which the width of the pattern d2 preferably ranges from about 30 μm to about 300 μm and the height of the pattern d3 preferably ranges from about d2×0.05 to about d2×1.

According to preferred embodiments of the present invention, the method for forming the geometrical pattern is at least either a molding method or a carving method.

Preferred embodiments of the present invention provide a back light guide which has defined areas on a bottom surface and geometrical patterns thereon, wherein the patterns are uniformly arranged in each area, however the patterns of each area are different. According to preferred embodiments of the present invention, it is easy to maximize the brightness distribution using little simulation time and effort. Furthermore, preferred embodiments of the present invention includes another pattern on the upper surface which acts as a light condenser so that the brightness is not inferior without the light condenser. Furthermore, preferred embodiments of the present invention provide a light guide which has a superior quality compared to the conventional one including the printed dot pattern arrangement.

The invention being thus described, it is obvious that the same invention may be varied in many ways. Such variations are not to be regarded as a departure from the spirit and scope of the present invention and all such modifications which are obvious to one skilled in the art are intended to be included within the scope of the following claims.

What is claimed is:

1. A back light unit for a liquid crystal display device comprising:

a light guide having a first surface, said first surface including a plurality of defined areas and a first geometrical pattern of uniform shape configuration on said plurality of defined areas, said geometrical pattern including geometrical shaped elements, said geometrical shaped elements being continuous along one dimension of said light guide, wherein each of said defined areas includes a plurality of pitches that are substantially the same between each geometrical shaped elements, and said plurality of defined areas including a first defined area, a second defined area, said second defined area located further away than a location of said first defined area relative to a substantially central portion on said first surface, and a pitch between said geometrical shaped elements in said first defined area is different from a pitch between said geometrical shaped elements in said second defined area; and a lamp attached to at least one side of the light guide.

2. The back light unit of claim 1, wherein the first geometrical pattern is defined by a shape being one of furrowed configuration and a ridged configuration.

3. The back light unit of claim 1, wherein the first geometrical pattern is one of a substantially V-shaped pattern and a substantially U-shaped pattern.

4. The back light unit of claim 1, wherein said geometrical shaped elements in a particular defined area having uniform scale.

5. The back light unit of claim 1, wherein said geometrical shaped elements have a width ranging from about 30 µm to about 300 µm and a height ranging from about 0.05 times the width to about 1 times the width.

6. The back light unit of claim 1, wherein the first geometrical pattern is substantially parallel to the lamp.

7. The back light unit of claim 1, wherein said pitches between said first geometrical shaped elements in said first defined area is different than pitches between said first geometrical shaped elements in another defined area.

8. The back light unit of claim 1, further comprising a second geometrical pattern on a second surface of the light guide which is opposite to the first surface.

9. The back light unit of claim 8, wherein the second geometrical pattern has a uniform array along all of the second surface.

10. The back light unit of claim 8, wherein the second geometrical pattern is substantially perpendicular to the lamp.

11. The back light unit of claim 1, wherein the light guide has a cross-sectional shape that is one of a uniform shape and a tapered shape.

12. The back light unit of claim 1, further comprising a reflecting sheet disposed under the first surface of the light guide;

a diffusing sheet disposed over a second surface of the light guide which is opposite to the first surface; and a light condenser disposed on the diffusing sheet.

13. The back light unit of claim 12, wherein the diffusing sheet has a holograph.

14. A back light unit for a liquid crystal display device comprising:

a light guide having a first surface and a second surface, the first surface including a plurality of defined areas, each of the defined areas including a plurality of first geometrical shaped elements, said first geometrical shaped elements being continuous along one dimension of said light guide, and said second surface including a plurality of second geometrical shaped elements; and a lamp attached to at least one side of the light guide;

wherein each of said defined areas includes a plurality of pitches that are substantially the same between each first geometrical shaped elements, and said plurality of defined areas including a first defined area, a second defined area, said second defined area located further away than a location of said first defined area relative to a substantially central portion on said first surface, and a pitch between said first geometrical shaped elements in said first defined area is longer than a pitch between said first geometrical shaped elements in said second defined area.

15. The back light unit of claim 14, wherein the s geometrical shaped elements have one of a furrowed configuration and a ridged configuration.

16. The back light unit of claim 14, wherein the first geometrical shaped elements has one of a substantially V-shaped pattern and a substantially U-shaped pattern.

17. The back light unit of claim 14, wherein said first geometrical shaped elements has a width which ranges from about 30 µm to about 300 µm and a height which ranges from about 0.05 times the width to about 1 times the width.

18. The back light unit of claim 14, wherein the first geometrical shaped elements are substantially parallel to the lamp.

19. The back light unit of claim 14, wherein the second geometrical shaped elements are substantially perpendicular to the lamp.

20. The back light unit of claim 14, wherein the light guide has a cross-sectional shape that is one of a uniform shape and a tapered shape.

21. The back light unit of claim 14, further comprising a reflecting sheet disposed under the first surface of the light guide;

a diffusing sheet disposed over a second surface of the light guide which is opposite to the first surface; and a light condenser disposed on the diffusing sheet.

22. The back light unit of claim 21, wherein the diffusing sheet has a holograph.

23. The back light unit of claim 14, wherein said second geometrical shaped elements of said second surface has one of a substantially V-shape and a substantially U-shape.

24. The back light unit of claim 14, wherein said second geometrical shaped elements of said second surface have one of a furrowed configuration and a ridged configuration.

25. The back light unit of claim 14, wherein each of said second geometrical shaped elements have a width which ranges from about 30 µm to about 300 µm and a height which ranges from about 0.05 times the width to about 1 times the width.

26. The back light unit of claim 14, further comprising a uniform array of said second geometrical shaped elements on said second surface.

27. The back light unit of claim 14, wherein said pitches between said first geometrical shaped elements in said first defined area is different than pitches between said first geometrical shaped elements in another defined area.

* * * * *